March 18, 1958 J. BLUM 2,827,229
CENTRIFUGE MOUNTING MEANS
Filed Aug. 26, 1953 2 Sheets-Sheet 1
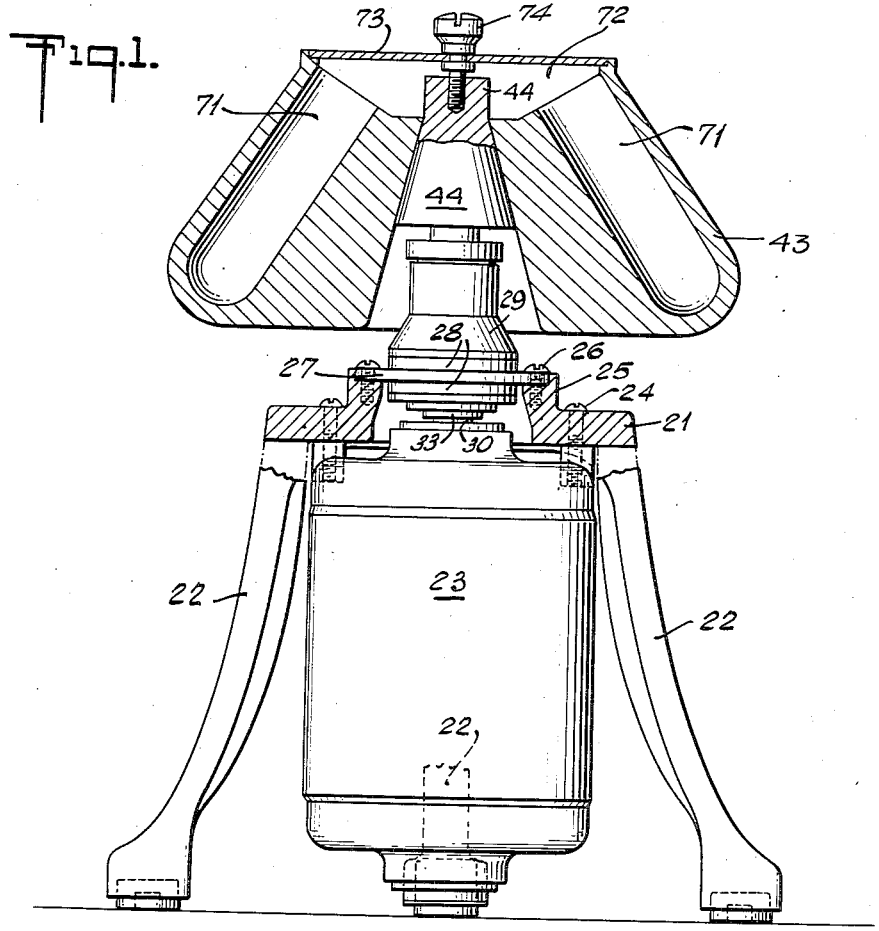
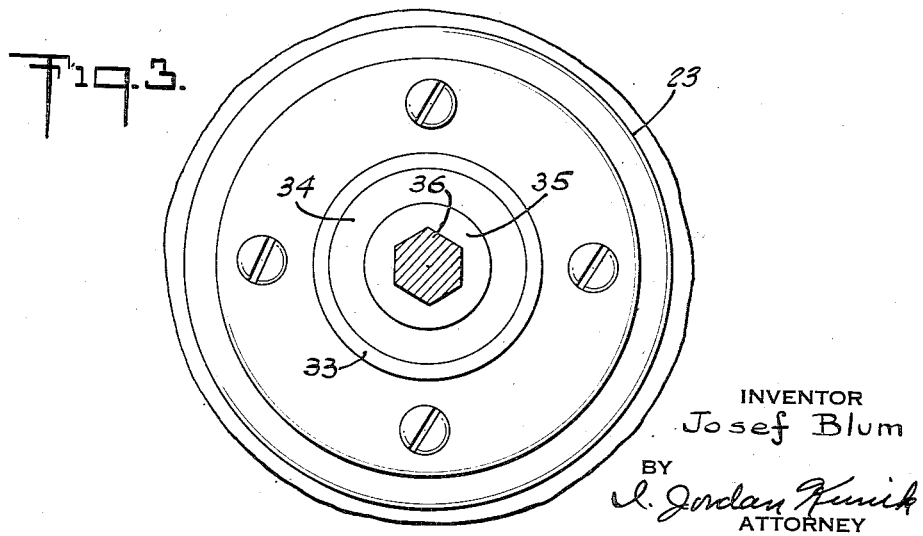
INVENTOR
Josef Blum
BY
J. Jordan Kunik
ATTORNEY

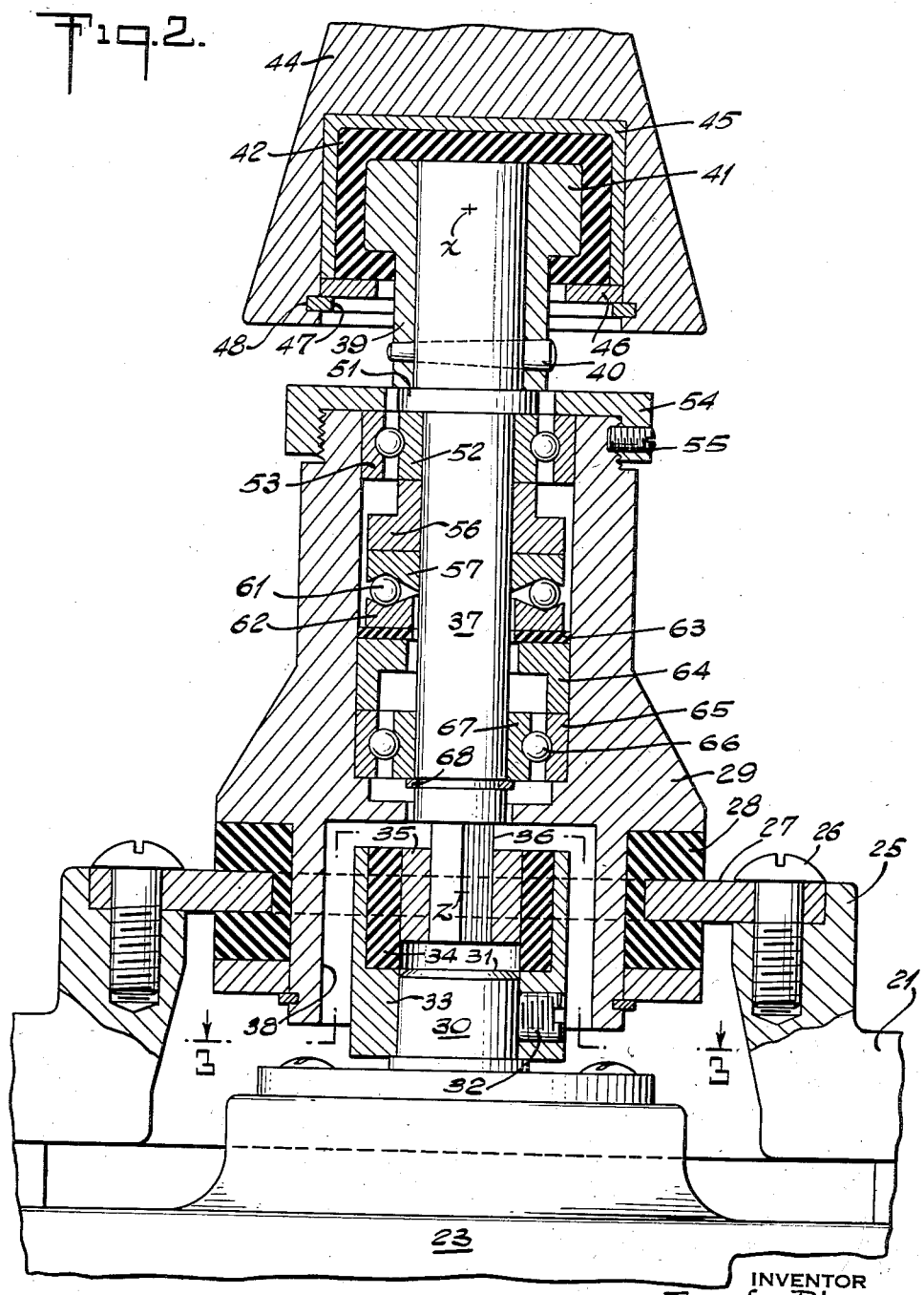

United States Patent Office 2,827,229
Patented Mar. 18, 1958

2,827,229

CENTRIFUGE MOUNTING MEANS

Josef Blum, New York, N. Y., assignor to Ivan Sorvall, Inc., New York, N. Y., a corporation of New York Application August 26, 1953, Serial No. 376,730

11 Claims. (Cl. 233—23)

This invention relates to centrifuges and more particularly to an improved high speed, motor driven centrifuge having novel mounting means both for the centrifuge shaft and for the rotor, and having other improved features of construction.

Despite numerous improvements that have been made in the construction of high speed, motor driven centrifuges, one of the remaining critical and basic problems is the provision of proper and safe balancing of the centrifuge rotor. In order to provide for suitable centrifugation, it is necessary to make the rotor as concentrically balanced as is possible so that the natural rotational axis of the rotor system substantially coincides with its geometrical axis. With rigid motor coupling and rigid mounting of the rotor, the slightest deviation from perfect rotor balance produces, at high speed, considerable forces and strains on the bearings and drive shaft, resulting in quickly worn out bearings and burnt out motor armature. Also, troublesome vibrations created by any unbalance produce deleterious effects upon the motor and its mountings.

It is a well known fact that a revolving, rigid body, if freely suspended, tries to rotate about an axis passing through the center of gravity. If a perfectly machined and dynamically balanced rotor were spun about its axis, a smooth running condition without vibration should theoretically be obtained. If, however, a weight is added to a certain portion of the rotor, the center of gravity is displaced laterally from the geometrical axis, as a result of which the rotor now spins about a new axis passing through a new center of gravity, and the geometrical axis is forced to move around a new rotating axis in an orbiting circle having a radius substantially equal to the lateral displacement. Even if the rotor is unbalanced to a small degree, its high speed will quickly cause a violent vibration not only of the rotor but of its mounting and the motor as well; and if the machine is permitted to continue operating in such a condition for any length of time, it will be found that the mountings would be destroyed and possibly sheared off, while there would also be a possibility of the machine throwing itself to pieces thereby endangering the safety of personnel in a laboratory and damaging property.

In order to obviate the foregoing difficulties and disadvantages, I provide a compound flexible mounting system for the rotor and for the rotor drive shaft whereby the rotor shaft performs as an articulating drive between an unbalanced rotor and the stationary motor base assembly, thereby permitting the geometric axis of the rotor to describe its natural dynamic axis in an orbital path. This is achieved by a flexible coupling between the motor drive shaft and the rotor shaft, and by a flexible coupling between the rotor shaft and the centrifuge rotor, whereby the rotor shaft follows freely the eccentricity of the rotor at its upper end with minimum transmission of any vibrations to the base assembly. These flexible couplings provide freely articulating or pivoting points, each permitting the critical elements of the centrifuge to become dynamically and cooperatively balanced when the centrifuge is in operation.

I provide a centrifuge structure wherein the rotor, if unbalanced in any degree, is permitted by its articulated coupling to the rotor shaft to find its own dynamic center and rotate about it without transmitting any appreciable vibration to the base assembly of the centrifuge. The rotor shaft and its housing are also flexibly articulated to the motor drive shaft whereby the upper end of the rotor shaft is free to follow the path of the geometrical center of the rotor to which it is attached. Thus any degree of oscillation at the coupling between the rotor and rotor shaft is reduced to a minimum or substantially eliminated at the articulated coupling between the rotor shaft and the motor drive shaft. Although these articulated couplings may preferably be made of molded natural or synthetic rubber, other suitable materials which absorb vibrating energy by flexing may be utilized. I also provide a novel articulated shaft housing which freely follows the pivoting action of the rotor shaft, and a novel shaft bearing structure which separates the thrust and radial loads of the centrifuge.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawings, in which:

Figure 1 is a vertical elevation, partly in section, of the centrifuge machine of the present invention;

Fig. 2 is a greatly enlarged central vertical cross section view of a portion of the machine shown in Fig. 1; and Fig. 3 is a view taken on line 3—3 of Fig. 2.

Referring now in detail to the drawings, there is shown in Fig. 1 a centrifuge machine comprising a base ring 21 supported by a plurality of legs 22 of which there may be three in number or more, as desired. Supported from the underside of ring 21 is a motor 23 attached by means of screw bolts 24 threaded through ring 21 and into suitable counterbored screw holes in the upper shoulders of motor 23.

Connected to upwardly extending collar 25 on ring 21 by means of screw bolts 26 is a mounting ring 27.

Referring to Fig. 2, mounting ring 27 supports, by means of a resilient coupling ring 28, an upwardly extending cylindrical shaft bearing housing 29. Ring 28, which may be made of a suitable natural or synthetic rubber, or alternatively, of a metal mesh vibration absorbing packing, is mounted in an annular recess in the lower outer periphery of housing 29, while the inner peripheral area of mounting ring 27 projects for some distance into a peripheral annulus in ring 28, thereby forming a firm but resilient mounting for housing 29.

The drive shaft 30 of motor 23 has a truncated end 31 to which is attached, by means of set screw 32, an upwardly extending sleeve 33. The upper end of sleeve 33 has attached to its internal walls a cylindrical packing 34 made of rubber, or of any other suitable vibration absorbing materials as in the case of ring 28. Packing 34 is bonded on its outer periphery to the inner periphery of sleeve 33. Bonded to the inside periphery of packing 34 is a metal socket sleeve 35 having an internal aperture of a regular polygonal shape, such as a square, hexagon, octagon, or the like.

Removably inserted into socket sleeve 35 is the lower end 36 of a driven rotor shaft 37 which extends upwardly through the interior of shaft housing 29. The lower end 36 of rotor shaft 37 has an outer contour which is substantially the same as the inner contour of sleeve 35 whereby a close fit is provided in order to furnish a positive rotating drive between drive shaft 30 and rotor shaft 37.

The assembly of sleeve 33, packing 34 and socket sleeve 35 extends upwardly into an axial recess 38 provided in the lower end of shaft housing 29, the internal walls and shoulders of said recess being spaced apart from said assembly to permit free rotation of the latter within the non-rotating housing 29. This arrangement is provided in order to locate the resilient coupling packing 34 in substantially the same plane with resilient coupling ring 28. Thus, any vibration of shaft 37 permitted by flexible coupling packing 34 will be transmitted to shaft housing 29 whose vibration will be absorbed by coupling ring 28. With resilient coupling ring 28 and resilient coupling packing 34 in substantially the same plane, shaft 37 and housing 29 will oscillate or vibrate as a unit about a common focal point Z located in the lower portion 36 of shaft 37, thereby minimizing or substantially eliminating any vibrations that might otherwise be transmitted to legs 22 or motor 23 of the centrifuge machine. In other words, the vibration absorbing functions of both resilient couplings 34 and 28 are jointly operative in the same plane substantially perpendicular to the longitudinal axis of shaft 37.

The upper end of vertically extending shaft 37 is enclosed by a removable steel sleeve 39 which is rigidly connected to shaft 37 by means of removable taper pin 40. The upper end of sleeve 39 has an outwardly extending flange 41 to the outside of which is bonded a resilient coupling packing 42 of natural or synthetic rubber, or of a metal mesh packing material. Packing 42 not only surrounds and is bonded to flange 41, but also extends over the upper ends of flange 41, sleeve 39 and shaft 37, and is bonded thereto.

Mounted on and around packing 42 on the upper end of shaft 37 is a circular centrifuge rotor, generally designated 43, having a central hub 44 of steel or the like. Hub 44 has a lower central recess to which is attached a cup-shaped metal housing 45. Metal housing 45 is bonded to the top and sides of packing 42. For purposes of structural strength and security between packing 42 and metal housing 45, there is provided a retaining ring 46 mounted adjacent the lower end of housing 45 and packing 42. Retaining ring 46 is maintained in position by snap ring 47 inserted into internal annulus 48 in hub 44.

The weight of shaft 37 is borne by an annular flange 51 on said shaft a short distance below taper pin 40, said flange resting on the internal race 52 of a ball bearing whose outer race 53 is connected to the internal periphery of housing 29. A screw cap ring 54 is threadably attached to the top of housing 29 and is maintained in position thereon by set screw 55 which prevents vibrations from working said ring 54 loose from its mounting. The neck of ring 54 extends over the top of outer race 53.

The lower edge of inner race 52 of the upper ball bearing is connected to an L-shaped ring 56 connected to and rotating with shaft 37. Connected to the lower edge of ring 56, and to shaft 37 and rotating therewith, is the upper race 57 of a thrust bearing which rests on balls 61, which, in turn, bear against a lower race 62 of the thrust bearing. It will be noted that lower race 62 of the thrust bearing is free of both shaft 37 and the internal peripheral surface of housing 29. Lower race 62 rests upon a resilient ring 63 made of natural or synthetic rubber, or the like, which in turn rests on an L-shaped ring 64 whose outer periphery alone is connected to the internal peripheral surface of housing 29. It will be noted that there is no physical connection between ring 64 and shaft 37. The lower end of ring 64 rests upon the outer race 65 of the lower ball bearing having balls 66 and an inner race 67 which is connected to and rotates with shaft 37.

Inner race 67 is maintained in position on shaft 37 by means of snap ring 68 which is inserted into a suitable annulus in shaft 37.

The provision of resilient ring 63 substantially midway between the lower and upper bearing mountings for shaft 37 permits the use of stock bearings since the resiliency of the ring compensates for any lack of precision in the dimensions of the bearings.

Rotor 43 has a plurality of downwardly and outwardly extending slots 71 arranged in a circle, each slot being adapted to receive a test tube or the like containing chemical or biochemical specimens, or the like, for centrifuging. Slots 71 are reached through a top central chamber 72 common to the mouths of each slot 71. A removable circular protective cover lid 73 fits over chamber 72 and may be secured in position by screw cover knob 74 threadably insertable into hub 44.

It is standard laboratory practice to load slots 71 with as nearly equal weights as possible in order to balance rotor 43 so that its high speed rotation will cause no undue vibrations. With prior centrifuges having rigid coupling between rotor and rotor shaft, and between rotor shaft and motor drive shaft, it was virtually mandatory that there be no greater weight deviation than about one gram between each of the test tubes and contents in each slot 71. Even in heavy rotors weighing between 6000 to 8000 grams, a deviation up to about five grams would introduce vibrations in the rapidly rotating rotor which, when transmitted to the rotor shaft and the base assembly, would cause cumulative injury to the machine and render it unstable on the laboratory table. Deviations greater than five grams would introduce excessive strains on the rotor and shaft mountings which could destroy the machine and endanger personnel and property in the laboratory.

In the machine of the present invention, however, rotor 43 can be unbalanced by as much as forty grams and run indefinitely at high speeds without any noticeable vibrations being transmitted to the base assembly. In some experiments, the rotor of my centrifuge has been unbalanced by sixty grams and has been run successfully at high speed without any injury or deleterious vibration. One of the rotors used in the experiments weighed 6800 grams.

Although it is not expected that the rotor will be deliberately unbalanced in laboratory practice, the novel combination of resilient couplings for both the rotor and rotor shaft provide a safety factor against the cumulative effect of repeated small deviations from perfect balance thereby prolonging the useful life of the instrument. Also, the novel construction herein makes allowance for a rotor whose structure may not be perfectly balanced.

Rotor 43 is mounted on shaft 37 so that its center of gravity is at point X in substantially the axial center of said shaft, said point being also substantially in the central point of an area bounded by packing 42. Rotor 43 may be considered as pivotable in all directions about point X on shaft 37 within the limits of the resiliency of packing 42.

It will be noted that the central aperture of rotor 43 is conically shaped in order to provide adequate clearance for shaft housing 29 to facilitate cooling of the bearings by air circulation and for ease in removal of the rotor. This structure differs from that of prior centrifuges where the rotors are rigidly connected to the whole length of the shaft or to the major longitudinal portion thereof.

While packing 42 is arranged to absorb a large amount of vibrations due to an unbalance of rotor 43, such vibrations as are not absorbed are transmitted to shaft 37 which, by virtue of its resilient mounting in packing 34, pivots about a point Z that is substantially in the center of an area bounded by packing 34. Hence, substantially all vibrations that are not absorbed by packing 42 are absorbed by packing 34. Since shaft housing 29 is provided with a resilient mounting by means of ring 28 which is in substantially the same plane with packing 34, the housing follows the pivoting action of shaft 37 and vibrates as a unit with it.

The reduction, substantial elimination of, or compensation for, the vibratory effects of unbalanced rotors as provided herein, considerably extend the life of the machine and its component parts, and serve to reduce commensurately the problems of maintenance and repair.

The provision of the novel yieldable and resilient mounting means for the rotor and rotor shaft herein, results in a smoothly operating centrifuge which has a large safety margin in operation, and which, if unbalanced to any degree, will perform the centrifuging function quietly and without causing the machine to vibrate in such a manner as to injure its mounting and its drive mechanism.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. A centrifuge comprising a frame, a motor mounted on said frame, a shaft, a resilient coupling between said motor and said shaft, a shaft housing, a resilient mounting between said frame and said housing, the resilient mounting and the resilient coupling being substantially in the same plane, whereby both said shaft and said housing oscillate around a substantially common point, a rotor, and a resilient coupling between said shaft and said rotor.

2. A centrifuge comprising a motor, a shaft, a resilient coupling between said shaft and said motor, a shaft housing around said shaft, a pair of spaced apart ball bearings supporting said shaft in said housing, a thrust bearing positioned intermediate said first mentioned pair of bearings, and a rotor resiliently coupled to said shaft.

3. A centrifuge according to claim 2, and further comprising a resilient ring between said thrust bearing and one of said other bearings.

4. A centrifuge according to claim 2, and further comprising a frame, said motor being attached rigidly to said frame, a resilient mounting between said frame and said shaft housing, the resilient coupling between said motor and said shaft being substantially in the same plane as the resilient mounting between said frame and said shaft housing.

5. A centrifuge comprising a frame, a motor mounted on said frame, a shaft, a resilient coupling between one end of said shaft and said motor, a rotor, a resilient coupling between said rotor and the other end of said shaft, a housing within which said shaft rotates freely, a resilient coupling between said housing and said frame, the motor coupling and the housing coupling being positioned in substantially the same plane whereby said shaft and said housing oscillate together relative to a substantially common point while said other end of said shaft is free to move in the orbital path of the geometrical center of said rotor when said center is displaced from the normal axis of said shaft due to any eccentricity of motion of said rotor.

6. A centrifuge according to claim 5, and further comprising a pair of spaced apart bearings supporting said shaft within said housing, and a thrust bearing positioned intermediate said first mentioned pair of bearings, said thrust bearing being adapted to bear the thrust load of said shaft and said rotor.

7. A centrifuge according to claim 5 wherein the resilient coupling between the housing and frame comprises a mounting ring connected to said frame, a resilient annulus mounted in the external periphery of said housing, the inner periphery of said mounting ring extending into said resilient annulus to a suitable depth.

8. A centrifuge comprising a frame, a motor mounted on said frame, a shaft, a resilient coupling between said shaft and said motor, a rotor, a resilient coupling between said rotor and said shaft, a stationary housing within which said shaft rotates freely, a resilient coupling between said housing and said frame, a recess in the end of said housing to accommodate the coupling between said motor and said shaft, the walls of said recess being spaced apart from said coupling to permit free rotation and articulation thereof, said motor-shaft coupling being substantially in the same plane with the coupling between said housing and said frame, all of said couplings cooperating when said rotor turns at high speed to absorb vibrations and oscillations induced by any eccentricity of motion of said rotor.

9. A centrifuge comprising a frame, a motor mounted on said frame, a drive shaft on said motor, a rotor shaft, a sleeve connected to the end of said motor drive shaft and extending beyond the end thereof, a resilient packing bonded to the internal periphery of said sleeve, a central aperture in said packing, a socket bonded to the internal periphery of said packing, said socket being spaced apart from the end of said drive shaft and adapted to receive the end of said rotor shaft to drive the latter, and a rotor resiliently mounted on the other end of said rotor shaft.

10. A centrifuge comprising a frame, a motor mounted on said frame, a drive shaft on said motor, a rotor shaft, a sleeve connected to the end of said motor drive shaft and extending beyond the end thereof, a resilient packing bonded to the internal periphery of said sleeve, a central aperture in said packing, a socket bonded to the internal periphery of said packing, said socket being spaced apart from the end of said drive shaft and adapted to receive the end of said rotor shaft to drive the latter, a rotor resiliently mounted on the other end of said rotor shaft, a stationary housing around said shaft, a mounting ring connected to said frame, a resilient annulus mounted in the external periphery of said housing, the inner periphery of said mounting ring extending into the resilient annulus to a suitable depth, said mounting ring and annulus being substantially in the same plane with said packing.

11. A centrifuge according to claim 10, and further comprising a pair of spaced apart bearings supporting said shaft within said housing, a thrust bearing positioned intermediate said first mentioned pair of bearings, said thrust bearing being adapted to bear the thrust load of said shaft and said rotor, and a resilient ring between said thrust bearing and one of said other bearings for compensating for any dimensional irregularities in said bearings.

References Cited in the file of this patent

UNITED STATES PATENTS

| 392,583 | Braun | Nov. 13, 1888 |
| 2,195,647 | Guy | Apr. 2, 1940 |
| 2,275,846 | Dunham | Mar. 10, 1942 |
| 2,725,188 | Scott | Nov. 29, 1955 |

FOREIGN PATENTS

| 201,320 | Germany | Sept. 8, 1908 |
| 832,426 | Germany | Feb. 25, 1952 |